United States Patent [19]
Vahabzadeh et al.

[11] Patent Number: 5,857,931
[45] Date of Patent: Jan. 12, 1999

[54] TRAVELING CHAIN DERAILER

[75] Inventors: Hamid Vahabzadeh, Oakland; Norman Kenneth Bucknor, Sterling Heights; Erkki Antero Koivunen, Northville, all of Mich.

[73] Assignee: General Motors Corporation, Detroit, Mich.

[21] Appl. No.: 810,968

[22] Filed: Feb. 27, 1997

[51] Int. Cl.⁶ .................................................. F16H 59/00
[52] U.S. Cl. .............................. 474/78; 474/80; 474/85
[58] Field of Search ............................ 474/101, 78, 111, 474/80, 81, 84, 85

[56] References Cited

U.S. PATENT DOCUMENTS

| | | | |
|---|---|---|---|
| 5,180,340 | 1/1993 | Vahabzadeh | 474/111 |
| 5,180,341 | 1/1993 | Vahabzadeh et al. | 474/111 |
| 5,201,688 | 4/1993 | Vahabzadeh | 474/111 X |
| 5,234,380 | 8/1993 | Vahabzadeh | 474/78 |
| 5,234,381 | 8/1993 | Vahabzadeh et al. | 474/78 |
| 5,246,406 | 9/1993 | Vahabzadeh | 474/242 |

*Primary Examiner*—Roger J. Schoeppel
*Attorney, Agent, or Firm*—Donald F. Scherer

[57] ABSTRACT

A traveling chain mechanism has spaced sprockets with an endless chain trained around them. A traveling chain is transferable between the sprockets radially inward of the endless chain. The speed ratio between the sprockets is dependent upon which sprocket has the traveling chain connected thereto. By transferring the traveling chain between the sprockets, the speed ratio is changed. A derailer mechanism initiates the transfer of the traveling chain from one sprocket to the other. The derailer mechanism incorporates a pair of axially spaced derailer arms that are axially movable into the path of a long pin on a lead link of the traveling chain. The long pin engages the arms to cause pivoting thereof thereby aligning a ramp thereon with the shorter pins on each link. The derailer arms guide the traveling chain to a guide track for transportation by the endless chain to the other sprocket.

2 Claims, 6 Drawing Sheets

TRAVELING CHAIN DERAILER

TECHNICAL FIELD

This invention relates to traveling chain mechanisms.

BACKGROUND OF THE INVENTION

Traveling chain mechanisms, such as those disclosed in U.S. Pat. No. 5,201,688, issued Apr. 13, 1993, and assigned to the assignee of the present invention, have a traveling member disposed around a sprocket radially inward of an endless chain trained around the spaced sprockets. The traveling member increases the effective diameter of the sprocket thereby affecting the drive ratio between the sprockets. The sprockets have the same diameter and therefore the traveling chain member will change the ratio from an under drive to an overdrive between input and output sprockets, depending upon which sprocket is currently supporting the traveling member.

To transfer the chain from one sprocket to another, a derailer mechanism, such as that shown in U.S. Pat. No. 5,180,341, issued Jan. 19, 1993, and assigned to the assignee of the present invention, is provided at each sprocket to release the traveling chain member. The derailer mechanism shown in the above patent includes a flexible plate member which has apertures in which the pins of each link of the traveling chain are entrapped. When the plates are separated or spread, the pins are released and the centrifugal action throws the lead link radially outward to engage a guide member which directs the traveling chain to the other sprocket.

The traveling chain has inner teeth which mesh with the sprockets and outer teeth which mesh with the endless chain. Thus, the traveling chain is driven by the endless chain during travel between the sprockets.

SUMMARY OF THE INVENTION

It is an object of the present invention to provide an improved derailer mechanism for a traveling chain mechanism.

In one aspect of the invention, a pair of axially spaced pivotally mounted derailer devices are deployed adjacent each sprocket. An actuating mechanism is included to move the derailing devices toward the sprocket to a derailing position at which a long pin on a lead link of the traveling chain will engage an arm on the derailer device and pivot it to a derailing guide attitude. Shorter pins on each of the traveling chain links will then engage a guide ramp on the derailer device in the pivoted position such that each link will be positively directed into a guide track. In the unpivoted position, the short pins will not engage the guide ramp even though the derailer devices are in the derailing position. This ensures that the lead link will initiate the derailing process. Thus, each derailing device has an unactuated position, a derailing initiating position and a derailing final position.

DESCRIPTION OF THE PREFERRED EMBODIMENT

Figure 1:
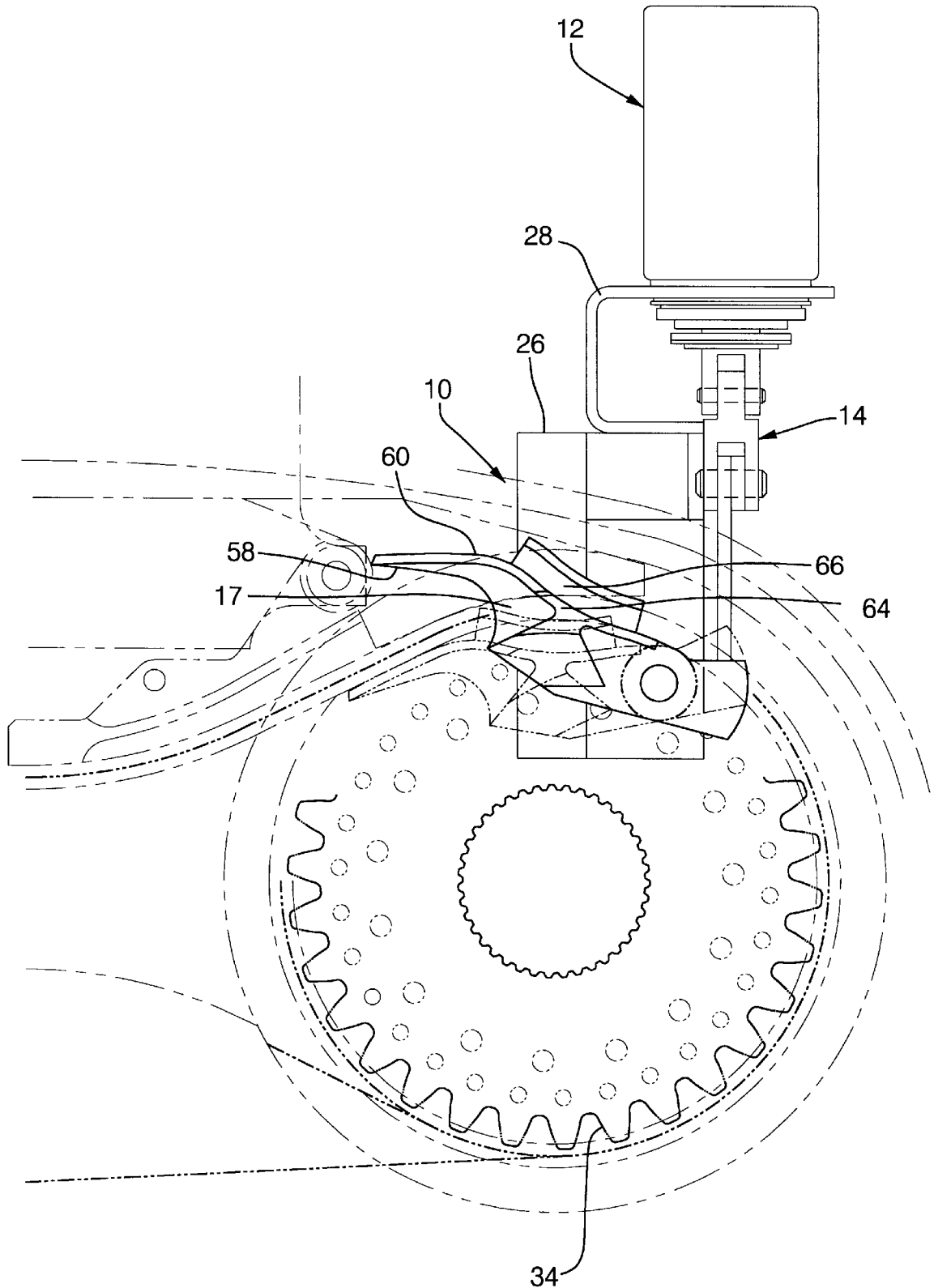
FIG. 1 is a side elevational view of the derailer mechanism incorporating the present invention.

Referring to the drawings, wherein like characters represent the same or corresponding parts throughout the several views, there is seen particularly in FIGS. 1 through 3 and 7, a derailer mechanism 10 including an actuator 12, a linkage 14 and a pair of axially spaced derailer devices 16 and 17.

Figure 2:
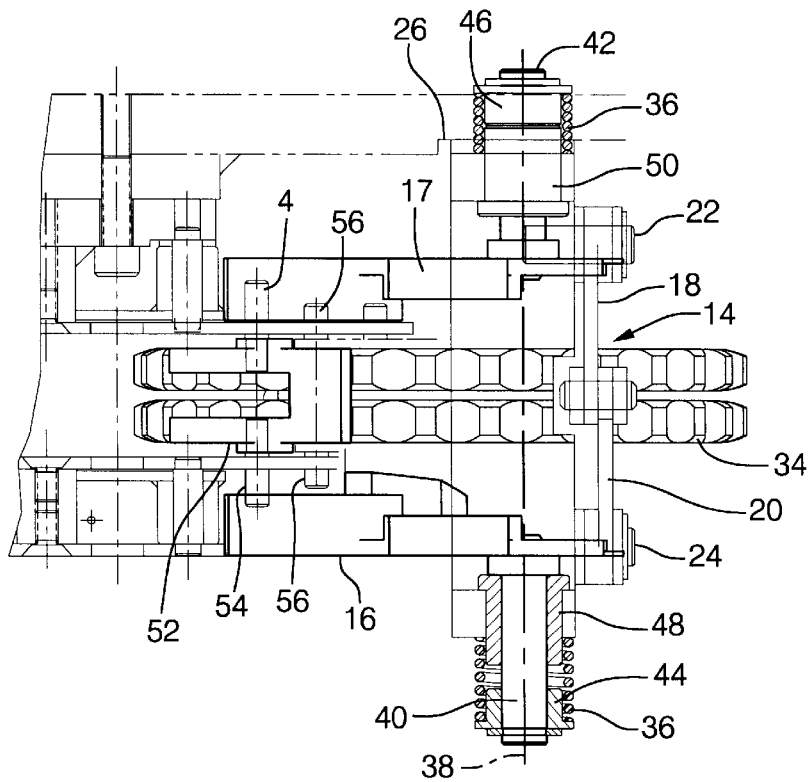
FIG. 2 is a top view of the derailer mechanism shown in FIG. 1.
Figure 3:
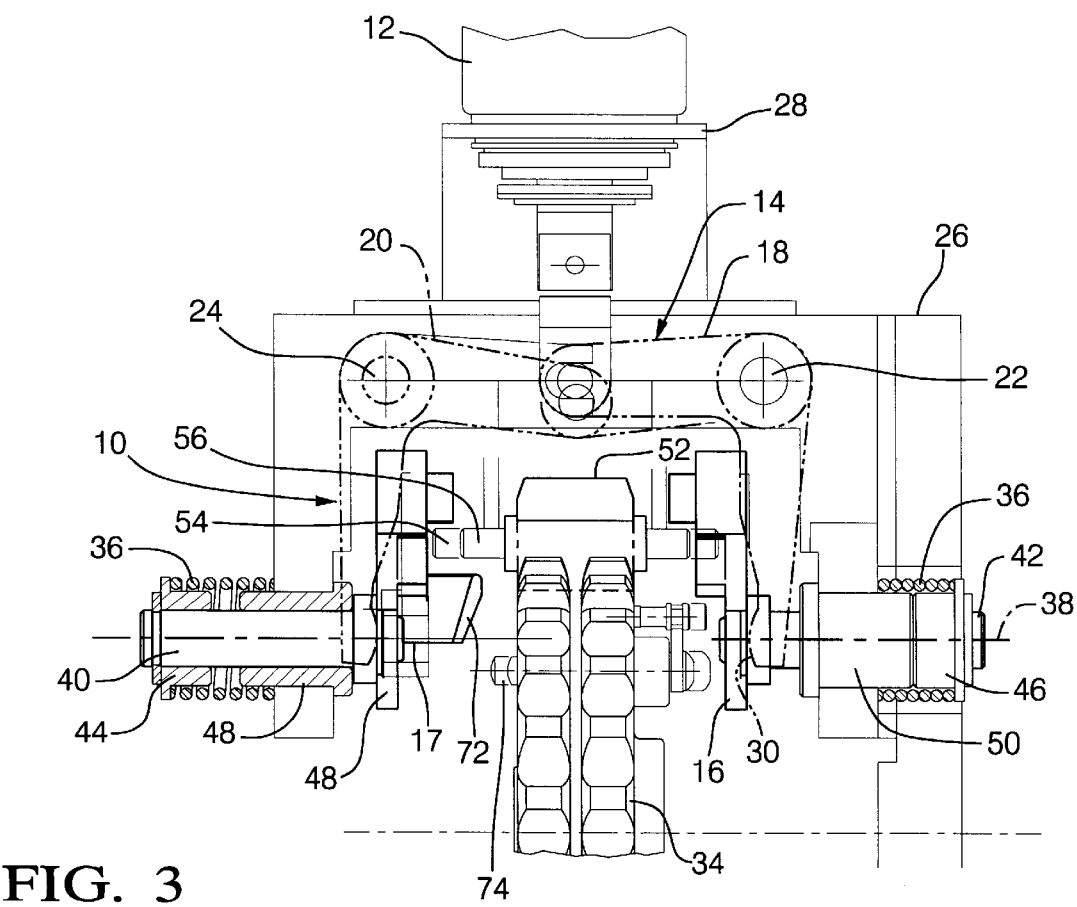
FIG. 3 is an end view of the derailer mechanism shown in FIG. 1.

As best seen in FIGS. 2 and 3, the linkage 14 is comprised of a pair of bell cranks 18 and 20 which are pivotally mounted on pins 22 and 24, respectively. The pins 22 and 24 are secured to a frame member 26 which also supports a bracket 28 which, in turn, supports the actuator 12. Each bell crank 18 and 20 have a tab portion 30 and 32, respectively, which are maintained in abutment with respective derailer devices 16 and 17.

The derailer device 17, as seen in FIGS. 2 and 3, is urged axially away from a sprocket 34 by a spring 36. The spring 36 is also effective to cause pivoting of the derailer device about a pivot axis 38 on a pin 40. This is the unactuated position which is shown in solid lines in FIG. 1.

The derailer device 16 is also responsive to a spring 36 which operates on a pin 42 in a similar manner. The derailer device 16 is shown in the initial actuated position in FIGS. 2 and 3. To accommodate pivoting of the derailer devices 16 and 17, the pins 40 and 42 are disposed in respective bushings 44 and 46 at the outer end thereof and in bushings 48 and 50 at the inner end thereof. The bushings 48 and 50 are secured with the frame member and are therefore not pivotable. The spring at one end is also secured to the frame member and at the other end is secured to bushings 44 and 46. The bushing 44 will rotate with the pin 40 which the bushing 46 will rotate with the pin 42. Thus, the spring 36 holds the derailer mechanism toward an unpivoted position. This is the position shown for the derailer device 17 in FIG. 1 and for the derailer devices 17 shown in FIG. 7.

Figure 4A:
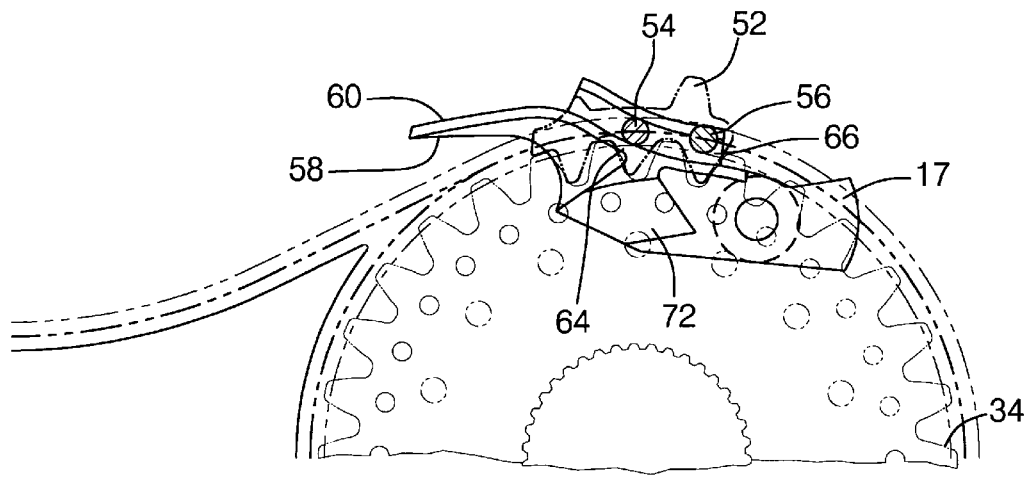
FIGS. 4A through 4C are side views of a portion of the derailer mechanism showing three operating positions.
Figure 4B:
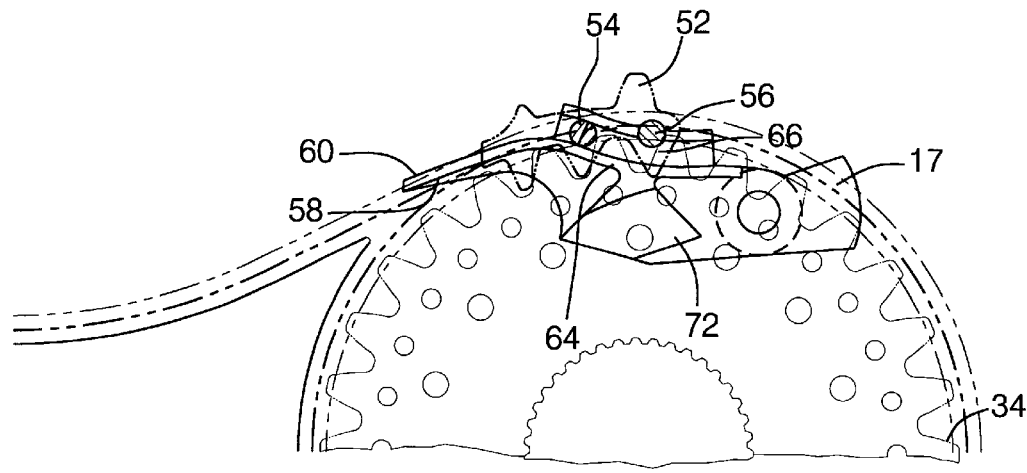
Figure 4C:
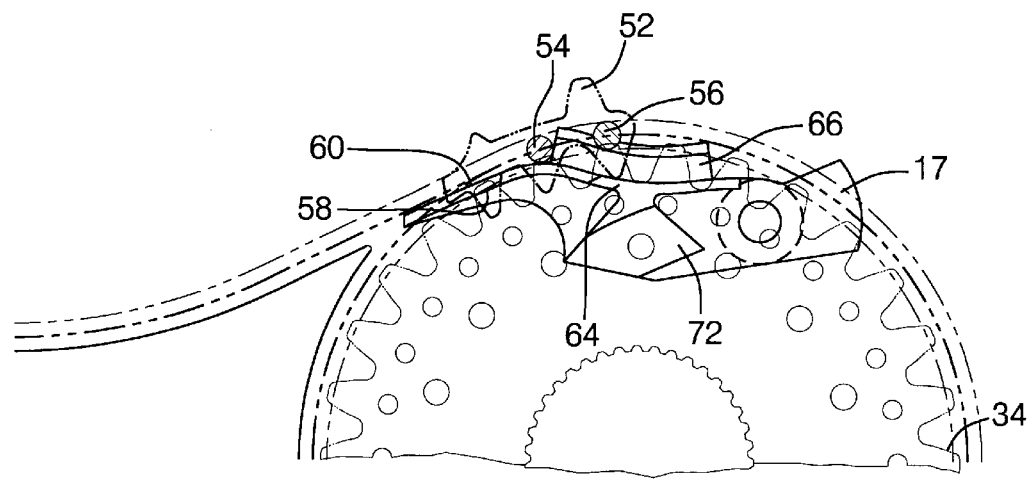

FIGS. 4A through 4C describe the three positions of the derailer device during its operation. In FIG. 4A, the derailer device 17 is in the unactuated position, such that the traveling chain will remain on the sprocket or the initial release position if the derailer device 17 has been moved inward. In FIG. 4B, the derailer device 17 is shown in the intermediate release position in which a lead link 52 will operate on the derailer device 17 to initiate release of the traveling chain. In FIG. 4C, the full release position is shown for device 17 such that all of the links will be released from the sprocket.

Figure 5:
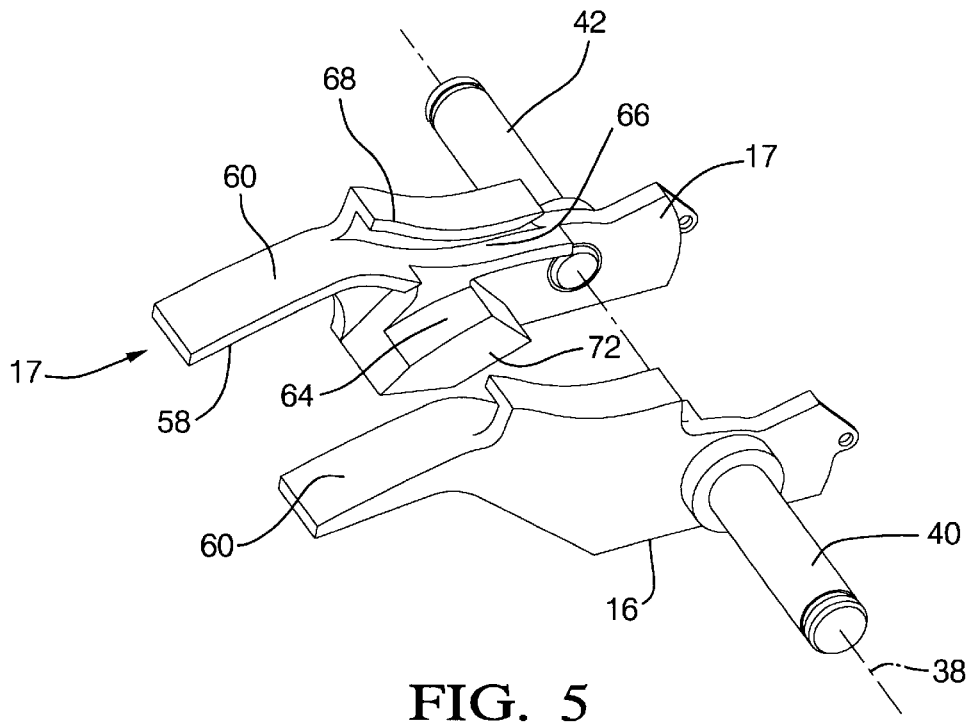
FIG. 5 is an isometric view of the two derailer devices of the derailer mechanism.
Figure 6:
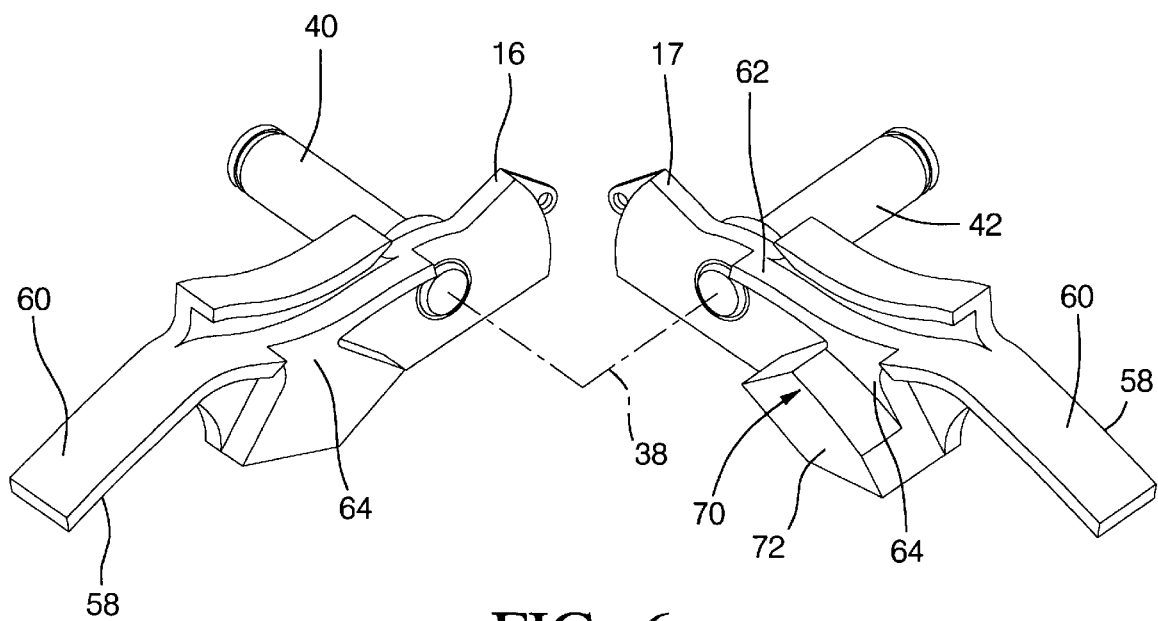
FIG. 6 is a view similar to FIG. 5 depicting the end surfaces of the derailer devices.

The lead link 52, as best seen in FIGS. 2 and 3, has a long or lead pin 54 and a short or conventional pin 56. The derailer devices 16 and 17, as best seen in FIGS. 5 and 6, have an arm 58 on which is formed a derailing ramp 60. Continuous with the derailer ramp is an initiating ramp 62. As noted in the drawings, the initiating ramp 62 is of less width than the derailer ramp 60.

Also formed on each derailer device 16 and 17 is a bypass area 64 which permits the long pin 54 and the short pins 56 to pass radially inward of the derailer ramps 60. In the unactuated position, the derailer devices 16 and 17 are extended axially along the pivot axis 38 such that the lead pin passes through the bypass area 64.

When the initial release position, as described in FIG. 4A is achieved, the lead or long pin 54 will engage the initiating ramp 62 while the short pins will continue to pass through the bypass area 64. As the long pin 54 engages the initiating ramp 62, the derailer devices 16 and 17 will be caused to pivot about the axis 38. The long pin 54 controls the derailer devices 16 and 17 and forces them to the released position shown in FIG. 4C. In the release position, the derailer devices 16 and 17 are displaced fully inward toward the sprocket 34, such that the short pins 56 will engage the ramp 60 thereby causing the links having short pins only to disengage from the sprocket 34 for movement or transportation to the other sprocket within the drive mechanism.

To ensure the long pin 54 remains engaged along the initiating ramp 62 and the derailing ramp 60, a guide slot 66 is provided which has an outer overhanging member 68 which prevents radially outward movement of the long pin 54 when the initiating ramp 62 is engaged.

Figure 9:
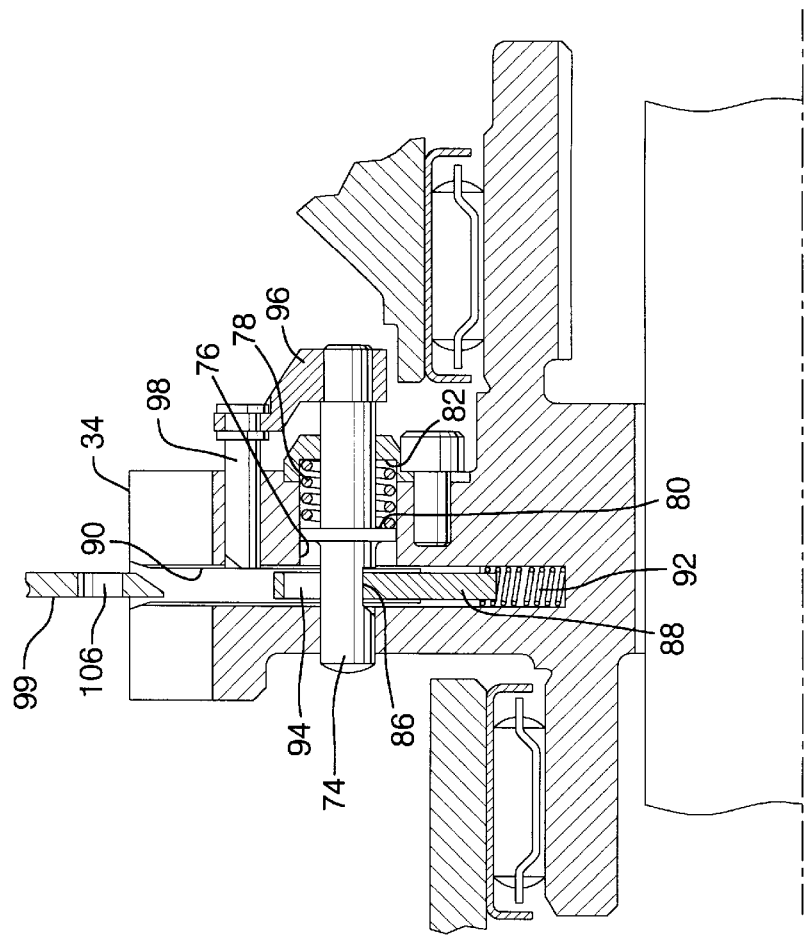
FIG. 9 is a sectional view of a lock mechanism for retaining the traveling chain to a sprocket.

Each derailer device 17 includes a cam 70 on which is a cam face 72. The cam face 72 is alignable with a plurality of release pins 74 which are disposed on the sprocket 34. As best seen in FIG. 9, the release pins 74 are slidably disposed in apertures 76 formed in the sprocket. The release pins 74 are urged leftward, as seen in FIG. 9, by a spring 78 trapped between a shoulder 80 on the pins 74 and a retaining device 82 secured to the sprocket 34. The locking mechanism shown in FIG. 9 is more fully disclosed in co-pending U.S. patent application Ser. No. 08/810,966, filed Feb. 27, 1997, (Attorney's docket H-197620) and assigned to the assignee of the present invention.

Each release pin 74 has a notch 86 which is alignable with a release plate 88 disposed in a slot 90 formed in the sprocket 34. The plate 88 is urged radially outward by a release spring 92. The release plate 88 has an aperture 94 through which the pin 74 extends. In the position shown in FIG. 9, the release plate is displaced radially outward by the spring 92 so as to be entrapped within the notch 76.

Each release pin 74 has an arm 96 which is connected with a lock pin 98. The lock pin 98 is displaceable into the slot 90 when the release plate 88 is depressed radially inward thereby releasing the pin 74 for leftward movement under the action of the spring 78. The release plate 88 is urged radially inward by a lock tab 99 formed on each link 100 of a traveling chain 102.

The tab 99 is also formed on the lead link 52 of the traveling chain 102. As the lock tab 99 is depressed or urged radially inward, the slot 90 by the action of the endless chain 104 acting on the outer surface of the traveling chain 102, the lock tab 99 will be disposed in abutment with the release plate 88 thereby forcing the radial inward motion of the release plate such that the release pin 74 is permitted to move leftward. As the release pin 74 moves leftward, the lock pin 98 will be urged into an aperture 106 formed in each lock tab 99. Thus, the lock pin 98 engaging the lock tab 99 will hold the traveling chain onto the sprocket 34.

During release of the traveling chain, the release pin 74 must be urged rightward such that the lock pin 98 will be withdrawn from the lock tab 99 so that the release plate 88 can urge the traveling chain radially outward for disengagement or unmeshing from the sprocket. To enforce the movement of the release pin 74, the cam face 72 is pivoted into alignment with the release pin 74 such that the release pins 74 will be urged rightward thereby unlocking the tab 99 from the lock pin 98 such that the traveling chain can disengage from the sprocket. The movement of the release pin rightward by the cam 70 will position the notch 86 within the aperture 94 such that the release plate 88 can be retained in the radial inward position and the lock pin 98 is retained in the unlatched position shown in FIG. 9.

Figure 7:
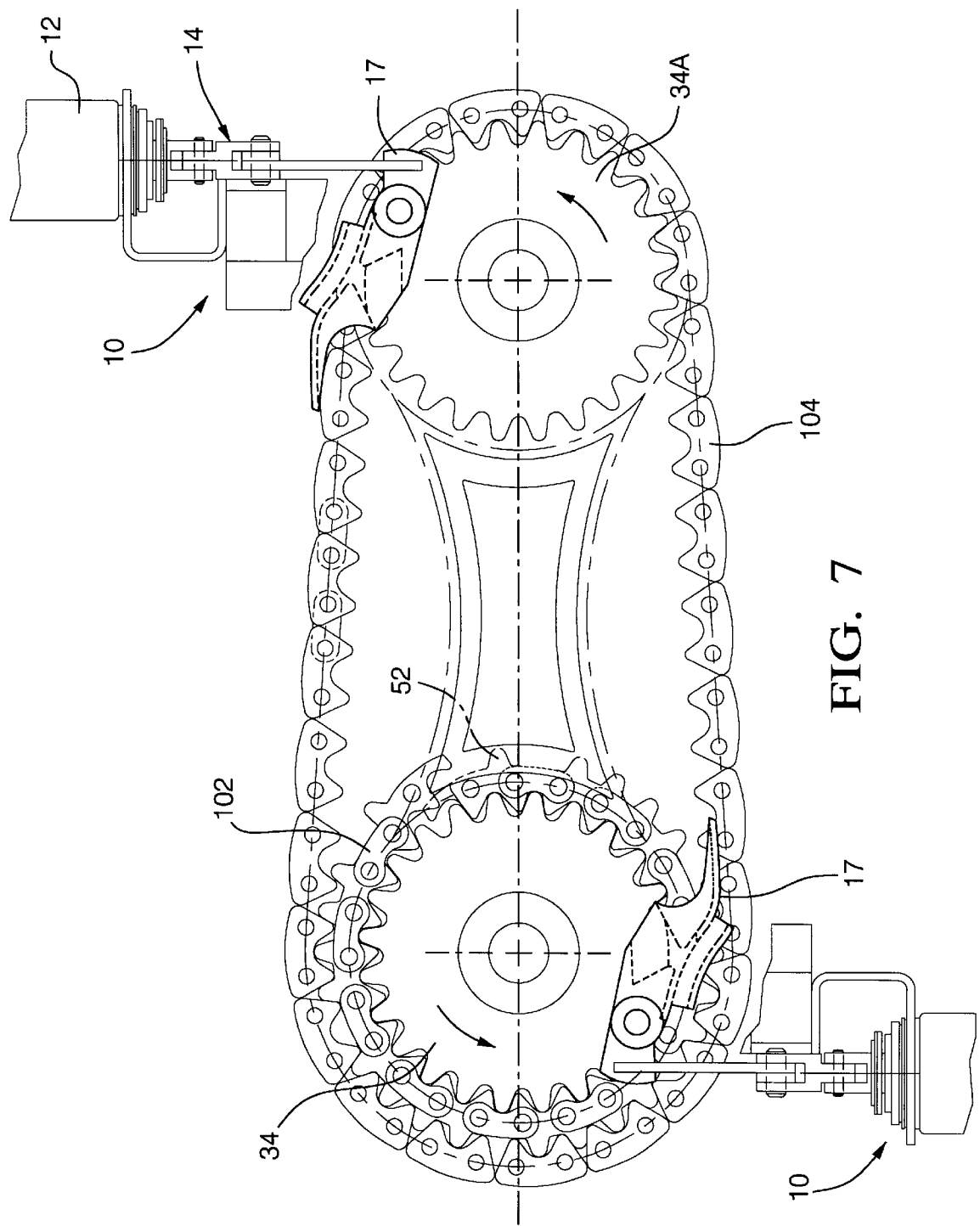
FIG. 7 is a side elevational view of a transfer chain mechanism with which the derailer devices can be utilized.
Figure 8:
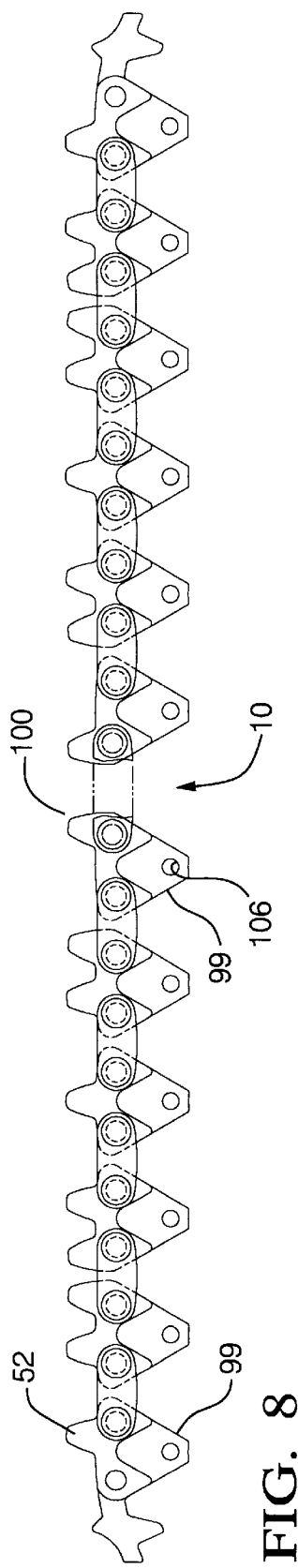
FIG. 8 is a side view of a traveling chain portion of the drive mechanism shown in FIG. 7.

As seen in FIG. 7, the endless chain 104 is entrained about sprockets 34 and 34A. The traveling chain 102 is entrained about the sprocket 34. If the derailer mechanism 10 is actuated, the traveling chain 102 will be released from the sprocket 34 when the lead link 52 reaches the derailer device 17. Upon the lead link 52 reaching the derailer device 17, the derailer action depicted in FIGS. 4A through 4C will occur. The lead of long pin 54 of the lead link 52 will engage the initiating ramp thereby beginning pivoting of the derailer devices 16 and 17 until the release position is reached, as shown in FIG. 4C. In this position, all of the pins, both long pin 54 and short pin 56, will be guided by the ramp 60 to disengage from the sprocket 34 and be driven by the endless chain 104 to the sprocket 34A. As the traveling chain 102 engages the sprocket 34A, each lock tab 99 will abut or engage the respective release plates 88 thereby releasing the pin 74 and the lock pin 98 to secure the traveling chain to the sprocket 34A. The traveling chain 102 will remain engaged or meshed with the sprocket 34A until the derailer mechanism 10 attached thereto is actuated to initiate release of the traveling chain 102.

With the present invention of the derailer mechanism, it should be appreciated by those skilled in the art that the traveling chain 102 is positively derailed through the action of each derailer device 16 and 17. The chain 102 does not rely on centrifugal forces for initial disengagement from the sprocket and is therefore a more positive release or derailing system. Also, with the present invention, only the lead link 52 will initiate derailment.

We claim:

1. A traveling chain mechanism comprising:

a pair of spaced rotatable sprockets;

an endless chain member trained around said sprockets;

a traveling chain adapted to selectively, individually enwrap said sprockets radially inward of said endless chain member, being selectively guided between said sprockets and having a plurality of links including a lead link and secondary links;

a derailer mechanism for releasing said traveling chain from at least one of said sprockets in preparation for traveling between said sprockets comprising; a pair of spaced derailer devices pivotally and axially supported on pin members, means for moving said derailer devices axially toward said traveling chain to a first release position for initiating release thereof, each derailer device having a guide slot, a derailing ramp and a derailer arm;

said secondary links each having a short derailing pin member, said lead link having a control pin positioned to enter said guide slot when said derailer devices are axially moved to the first release position, said control pin engaging each derailer arm to enforce pivoting of said derailer devices to a second release position to place said derailing ramp in a path of said short derailing pin members, said guide slot being aligned with said control pin and said short derailing pin members for guiding said links when said second release position is attained, said short pin members retaining said derailer devices in said second release position until all of the links of the traveling chain are released from said one sprocket.

2. A traveling chain mechanism comprising:

a pair of spaced rotatable sprockets;

an endless chain member trained around said sprockets;

a traveling chain adapted to selectively, individually enwrap said sprockets radially inward of said endless chain member, being selectively guided between said sprockets and having a plurality of links including a lead link;

a derailer mechanism for releasing said traveling chain from at least one of said sprockets in preparation for traveling between said sprockets comprising; a pair of spaced derailer devices pivotally and axially supported on pin members, means for moving said derailer devices axially toward said traveling chain to a release position for initiating release thereof, each derailer device having a guide slot and a derailer arm, a cam member formed on one of said derailer devices for selectively engaging cam followers on said one sprocket to selectively unlock said traveling chain from said one sprocket, said lead link having a control pin positioned to enter said guide slot when said derailer devices are axially moved to the release position, said control pin engaging each derailer arm to enforce pivoting of said derailer devices to a derailing position to place said cam in a path of said cam follower to release said lead link, said guide slot being aligned with short pin members on each of the other links for guiding said other links when said derailing position is attained and to pass radially inward of said guide slots when the derailing position is not attained, said short pin members retaining said derailer devices in said derailing position, when attained, until all of the links of the traveling chain are released from said one sprocket.

* * * * *